United States Patent
Kamm et al.

(10) Patent No.: US 11,884,130 B2
(45) Date of Patent: Jan. 30, 2024

(54) BEARING ARRANGEMENT AND AIR VENT HAVING SUCH A BEARING ARRANGEMENT

(71) Applicant: DR. SCHNEIDER KUNSTSTOFFWERKE GMBH, Kronach (DE)

(72) Inventors: Daniel Kamm, Altenkunstadt (DE); Dominic Horner, Kronach (DE)

(73) Assignee: DR. SCHNEIDER KUNSTSTOFFWERKE GMBH

( * ) Notice: Subject to any disclaimer, the term of this patent is extended or adjusted under 35 U.S.C. 154(b) by 294 days.

(21) Appl. No.: 17/420,094

(22) PCT Filed: Jan. 7, 2020

(86) PCT No.: PCT/EP2020/050199
§ 371 (c)(1),
(2) Date: Jun. 30, 2021

(87) PCT Pub. No.: WO2020/144174
PCT Pub. Date: Jul. 16, 2020

(65) Prior Publication Data
US 2022/0080804 A1   Mar. 17, 2022

(30) Foreign Application Priority Data
Jan. 10, 2019 (DE) ............. 10 2019 100 496.9

(51) Int. Cl.
*B60H 1/00* (2006.01)
*B60H 1/34* (2006.01)

(52) U.S. Cl.
CPC ............. *B60H 1/00678* (2013.01); *B60H 2001/00707* (2013.01); *B60H 2001/3478* (2013.01)

(58) Field of Classification Search
CPC ........ B60H 1/00678; B60H 2001/3464; B60H 2001/3471
(Continued)

(56) References Cited

U.S. PATENT DOCUMENTS

| 3,602,127 A | 8/1971 | Walker et al. ................ 98/110 |
| 5,470,276 A | 11/1995 | Burnell et al. ............... 454/155 |
| 6,520,198 B1 * | 2/2003 | Nishijima ........... F24F 13/1486 251/305 |

FOREIGN PATENT DOCUMENTS

| DE | 2 012 000 | 2/1971 | ............ B60H 1/34 |
| DE | 200 19 038 | 6/2001 | ............ B60H 1/34 |

(Continued)

OTHER PUBLICATIONS

International Search Report and Written Opinion issued in PCT/EP2020/050199, dated May 7, 2020, with English translation, 19 pages.

(Continued)

*Primary Examiner* — Allen R. B. Schult
(74) *Attorney, Agent, or Firm* — HAYES SOLOWAY P.C.

(57) ABSTRACT

A bearing arrangement has a bearing pin and a coupling pin, and a second bearing component, which components are mounted on a wall so as to be rotatable about a common axis of rotation. The bearing pin extends along, and the coupling pin extends eccentrically to the axis of rotation. The bearing pin is accommodated in a bearing opening of the wall. The coupling pin is accommodated in a guide slot of the wall and projects from the guide slot. The second bearing component has a first opening, in which the bearing pin is accommodated, and a second opening arranged eccentrically to the first opening, in which second opening the coupling pin is accommodated. The bearing pin is connected to the second (Continued)

bearing component via a lock, and the second bearing component is supported on the coupling pin.

14 Claims, 7 Drawing Sheets

(58) Field of Classification Search
USPC .......................................................... 454/143
See application file for complete search history.

(56) References Cited

FOREIGN PATENT DOCUMENTS

| EP | 1 086 838 | 3/2001 | ............... B60H 1/00 |
| EP | 2 602 137 | 8/2012 | ............... B60H 1/34 |

OTHER PUBLICATIONS

International Preliminary Report on Patentability issued in PCT/EP2020/050199, dated Jun. 16, 2021, with English translation, 16 pages.

\* cited by examiner

BEARING ARRANGEMENT AND AIR VENT HAVING SUCH A BEARING ARRANGEMENT

A bearing arrangement and an air vent with a bearing arrangement are described.

The bearing arrangement can relate to, for example, an air vent for vehicles, wherein a first bearing component of the bearing arrangement is an air guide element, for example a slat, and a second bearing component of the bearing arrangement is a lever, which are rotatably mounted on a housing of the air vent. The bearing arrangement can also relate to a throttle flap of an air vent, which serves for regulation of the supplied air and for that purpose is rotatably mounted on a housing. The bearing arrangement can be coupled by way of the lever with, for example, an entrainer for transmission of rotational movements and/or for coupling with further elements such as, for example, slats.

BACKGROUND

Air vents serve for deflection of supplied air made available by an air conditioning installation or other ventilating equipment. Air vents are used, particularly in vehicles, for the purpose of introducing fresh air, temperature-controlled air and/or conditioned air into the passenger compartment of a vehicle. Vehicles can be, for example, motor vehicles, such as passenger cars, trucks or buses, trains, aircraft or ships. Air vents can be arranged, for example, in a vehicle dashboard or in the region of the A, B or C pillar or at the roof of a motor vehicle.

Bearing arrangements are used in, for example, air vents for the purpose of pivotable mounting of slats. In that case, play-free mounting of the slat relative to the housing of the air vent as well as transmission of force for pivotation of the slat are of primary concern.

PRIOR ART

Conventional bearing arrangements for air vents comprise for that purpose, for example, coupling rods which brace the slats relative to one another and relative to a housing wall. In addition, devices are also known in which bearing pins of slats are supported outside a housing.

However, the known constructions have various disadvantages. The introduction of force for pivotation usually has to take place within an air channel in the housing of the air vent, in which case for that purpose, for example, a lever acts on a slat, the lever acting on the slat to be pivotable about an axis extending parallel to the pivot axis. Such devices in an air channel lead to undesired deflection of air and can, in addition, cause disruptive noises during through-flow of air.

A remedy can be achieved if the rotational movement is introduced from outside the air channel by way of the slat, preferably by way of the bearing pin of the slat. For that purpose the bearing pin would have to have a comparatively large diameter, which from the production aspect obliges very tight tolerances in order to ensure rotational movement without play and without clashing. However, bearing pins of such construction cannot be realised economically.

An enormously large proportion of waste would be the consequence in that case. Alternatively, the manufacture of such slats or the construction of such bearing pins at slats would be able to be realised only with a very substantial outlay.

A vent with simultaneously adjustable slat elements is described in DE 200 19 038 U1. The rotation of the slats takes place by way of bearing pins at the ends thereof, which function as an axis of rotation. Simultaneous drive of the individual slats takes place by way of eccentric pins similarly arranged at the ends of the slats. The eccentric pins and thus the slats are interconnected by a connecting element. The bearing pins and eccentric pins project through cut-outs in the side walls of the vent housing, in which case bores have to be provided for the bearing pins and slots for the eccentric pins. The connecting element is arranged outside the housing.

U.S. Pat. No. 5,470,276 A discloses a diffusor vent with adjustable slats. Two groups of slats are respectively connected together by way of first pins and a coupling element and thereby execute simultaneous movements. Provided at each group of slats is a respective further pin which projects via a slot through the vent housing and is connected with a setting disc. Through rotation of the setting disc the two groups of slats execute pivot movements in different directions, as a result of which diffusion of the issuing air flow can take place.

EP 1 086 838 A1 discloses a damping device which belongs to an air-conditioning installation of a vehicle and which serves the purpose of switching different air flows, particularly temperature settings, by performing opening and closing of inlet and outlet openings. Provision is made in that regard to mount a damper flap at a passage of a housing to be rotatable about a bearing pin. The damper flap can be pivoted by way of a lever mounted on this bearing pin and the passage closed or freed.

DE 20 12 000 A1 discloses a ventilating device with an adjustable valve device constructed as a flap, which is rotatable about an axis, in a housing shaft. The valve device is mounted on a shaft which is provided with a pin with square cross-section seated in a corresponding hole of the valve device. Adjustment of the valve device is made possible by drive of a rim gear integrally formed on the shaft.

EP 2 602 137 A2 shows an air outlet device with slats, which are rotatably arranged in a housing, for influencing the flow direction of an air flow. One slat has a bearing pin which is received in a gate guide of a wall, projects out of the gate guide and is received in a differently shaped gate guide of a guide block. The guide block is held at the wall to be slidably movable. Displacement of the bearing pin within the two gate guides is achieved by displacement of the guide block, as a result of which the slat is pivoted.

Object

In relation to the known constructions the object is to indicate a solution which represents an improved bearing arrangement, particularly for bearing components such as slats and throttle flaps, and is of simple construction and which in conjunction with a simpler construction of the bearing arrangement provides transmission of torque for pivotation of the bearing components.

Solution

The aforesaid object is fulfilled by a bearing arrangement with a first bearing component, comprising a bearing pin and a coupling pin, and a second bearing component, which are mounted on a wall to be rotatable about a common axis of rotation, wherein the bearing pin extends along the axis of rotation and the coupling pin extends eccentrically with respect to the axis of rotation, the bearing pin is received in a bearing opening of the wall, the coupling pin is received in a guide slot of the wall and projects out of the guide slot, the second bearing component has a first opening, in which the bearing pin is received, and a second opening, which is arranged eccentrically with respect to the first opening and in which the coupling pin is received, the bearing pin is connected with the second bearing component by way of detent means and the second bearing component is supported on the coupling pin.

The bearing pin of the first bearing component is rotatably mounted in the bearing opening of the wall and is connected with the second bearing component by way of the detent means. The detent means can be configured by a special formation of the bearing pin of the first bearing component and/or by a special formation in the region of the first opening of the second bearing component. The detenting ensures, in conjunction with the mounting of the second bearing component on the coupling pin, provision of compensation for play for the coupling of the first bearing component and the second bearing component. As a result, securing of the first bearing component to the wall can also be provided. In that case, the second bearing component is supported on the coupling pin by way of the section with the second opening and is held at the bearing pin by way of the section with the first opening via the detent means.

These sections of the second bearing component can be displaced or tightened relative to one another so that compensation for play is achieved. Torque is thus transmissible to the first bearing component by way of the second bearing component, as a result of which the configuration of the bearing pin is kept simple and there is no need to maintain close tolerances. Supporting at the bearing pin is effected in the opposite direction to the supporting at the detent means. The bearing arrangement thus enables transmission of a rotational movement without play.

Transmission of torque is achieved by way of the bearing pin without a specially constructed bearing pin being required for that purpose. Production tolerances for the bearing pin can therefore be wider. Moreover, the bearing pin can have a small diameter, since this does not have to be utilised for torque transmission for turning or pivoting the first bearing component.

Securing of the first bearing component to the wall is carried out by insertion of the bearing pin into the bearing opening and insertion of the coupling pin into the guide. The second bearing component is subsequently placed on the first bearing component in such a way that the bearing pin is received in the first opening of the second bearing component and the coupling pin is received in the guide of the second bearing component.

The first bearing component and the second bearing component are mounted to be free of play relative to one another, as a result of which rattling is excluded and in that case, in addition, transmission of the rotational movement by way of the coupling pin can be undertaken.

Play-free mounting of the first bearing component on the wall can be achieved, wherein the first bearing component and the second bearing component are supported on opposite sides at the wall. In that case, the resilient mounting of the second bearing component makes it possible for the first bearing component to be able to be supported at the wall and at the same time mounted free of play, since the bearing pin projecting through the bearing opening and the coupling pin projecting through the guide slot on the opposite side of the wall are connected with the second bearing component, which in turn is braced by way of the coupling pin and the bearing pin and is supported for play-free mounting at the opposite side of the wall. Supporting of the second bearing component at the side of the wall opposite the side at which the first bearing component is supported can be carried out by any desired section of the second bearing component. For example, the second bearing component can for this purpose have a special section or special means which is preferably opposite one of the support points of the second bearing component at the first bearing component.

The second bearing component can be resiliently supported at the coupling pin. For that purpose the wall can have a first support element. The first support element can, for example, be integrally formed on the wall. It is possible to injection-mould the first support element in a two-component injection-moulding process from a softer material at the wall, which consists of a harder material by comparison with the first support element. The first support element can consist of, for example, a thermoplastic elastomer. In further embodiments the first support element can be executed as a resilient element which projects from the wall and can be pressed in the direction of the wall. The resilient mounting assists play-free detenting.

For example, the second bearing component can also be supported at the wall by way of a (partly) annular section, which at least partly surrounds the first opening of the second bearing component. Moreover, this section can, for example, project in the direction of the wall and in that case protrude from the surface of the second bearing component.

The closing dimension between first bearing component, second bearing component and/or wall can be executed as a transition fit or interference fit. It is thereby ensured that the first bearing component is mounted on the wall free of play. Compensation takes place by way of the resilient mounting of the second bearing component on the coupling pin, at the bearing pin and the supporting at the wall. There are several closing dimensions between first and second bearing components, wherein play from the slat is similarly accepted by way of the wall so that the slat no longer displaces in its longitudinal direction. Moreover, the bearing pin of the first bearing component can have a clearance fit with respect to the bearing opening in the wall. By virtue of the resilient mounting of the second bearing component it is ensured, notwithstanding the clearance fit, that the first bearing component and the second bearing component are mounted free of play relative to one another and free of play relative to the wall. Displacement of the first bearing component in the direction of the axis of rotation is thereby prevented. Compensation for play orthogonal to the axis of rotation is also provided by way of the detent means.

The coupling pin can have at least one shoulder on which the second bearing component is supported. The at least one shoulder extends orthogonally to the longitudinal axis of the coupling pin and forms a support surface for a region of the second bearing component which surrounds the second opening of the second bearing component.

As detent means the bearing pin can comprise a detent element which by comparison with a bearing section adjoining along the axis of rotation has a larger diameter greater than the diameter of the first opening of the second bearing component, wherein the detent element engages behind the first opening of the second bearing component. For example, the detent element has a mushroom head which enables simple detenting. A mushroom head has a widening head with a substantially planar detent surface orthogonal to the axis of rotation of the bearing pin, as a result of which insertion of the bearing pin is possible in simple manner by the configuration of the mushroom head without expenditure of a large amount of force and after the insertion the lower side of the mushroom head bears against a wall bounding the first opening. The bearing pin is secured against being moved out through the contact with the wall or walls bounding or surrounding the opening, wherein the wall or walls can also be termed support section for the bearing pin. Bracing of the second bearing component relative to the first bearing component arises, after detenting of the mushroom head, in co-operation with the at least one shoulder of the coupling pin. If the second bearing component is additionally supported at the wall, bracing relative to the wall also arises.

The second bearing component can be of radially resilient construction in the region of the first opening and/or the bearing pin can be of radially resilient construction. Insertion of the mushroom head or of a bearing pin with a detent element is thereby facilitated. In that case, during insertion the first opening can be temporarily enlarged. For that purpose, the second bearing component can have in the region of the first opening at least one incision enabling enlargement of the first opening. For example, such a support section can surround the first opening in substantially C-shaped manner. The second bearing component can then also surround the first opening in C-shaped manner in the region of the first opening. In addition, the bearing pin can have a gap along the longitudinal axis so that the bearing pin can be compressed at least in the upper section in which a mushroom head for detenting is present and thus the diameter can be reduced. Insertion of the bearing pin into the first opening is facilitated by way of that.

The first bearing component and/or the first opening of the second bearing component can also have chamfers facilitating insertion of the detent element. A corresponding detent element, for example a mushroom head, can be easily inserted by way of the chamfers.

The first bearing component can have a second support element directed towards the wall. The first bearing component is supported by way of the second support element at the side of the wall opposite the side of the wall at which the second bearing component can be supported.

In that case, the second support element and the coupling pin can be opposite with respect to the axis of rotation so that tilting is avoided or, at least, inhibited. Mounting of the first bearing component on the wall is thereby improved.

The second bearing component can have at least two support sections, which are displaceable relative to one another in the axial direction of the first opening, for the detent element. On the one hand, insertion of a detent element of the bearing pin into the first opening is thereby improved. On the other hand, it is thereby achieved that at least one of the sections can displace relative to the other section, for example parallel to the wall, which creates bracing for play-free connection between the first bearing component and second bearing component. Moreover, bracing relative to the wall can thus be achieved if the second bearing component is supported directly at the wall by way of a corresponding support section.

The aforesaid object is also fulfilled by an air vent with a housing and at least one bearing arrangement according to any one of the foregoing constructions, wherein the first bearing component is configured as an air guide element and received in a bearing opening and the coupling pin is received in a guide slot of a housing wall of the air vent, and wherein the second bearing component is constructed as a lever and the air guide element is supported free of play on the housing wall by way of the coupling pin, a first support element at the wall, a second support element of the first bearing component and the detent means.

The air vent can comprise a plurality of air guide elements, which are each mounted on the housing wall by way of a respective lever. The air guide elements are present on the inner side of the housing of the air vent in the air channel. The levers are placed from outside on the coupling pins and the bearing pin and enable play-free mounting with a decoupled transmission of torque by way of the coupling pins. In that case it is sufficient to mount the air guide elements on one side by way of the bearing arrangement described herein with a second bearing component or the lever. The opposite side of the first bearing component or of the air guide element can comprise a further bearing pin, which is received in a simple opening. However, this mounting has no effect on the transmission of torque and the play-free mounting.

The air vent as well as the components of the air vent and the bearing arrangement can substantially consist of plastic and be produced economically and rapidly in an injection-moulding process on a large scale.

Individual components of the air vent or the bearing arrangement can also comprise illuminatable elements or be fully illuminatable so that illumination of the air vent or components thereof can be achieved. For example, coupling in of light can be effected by way of the bearing pin and/or by way of the coupling pin.

Further advantages, features and possibilities of embodiment are evident from the following figure description of embodiments, which are to be understood as non-limiting.

Figure 1:
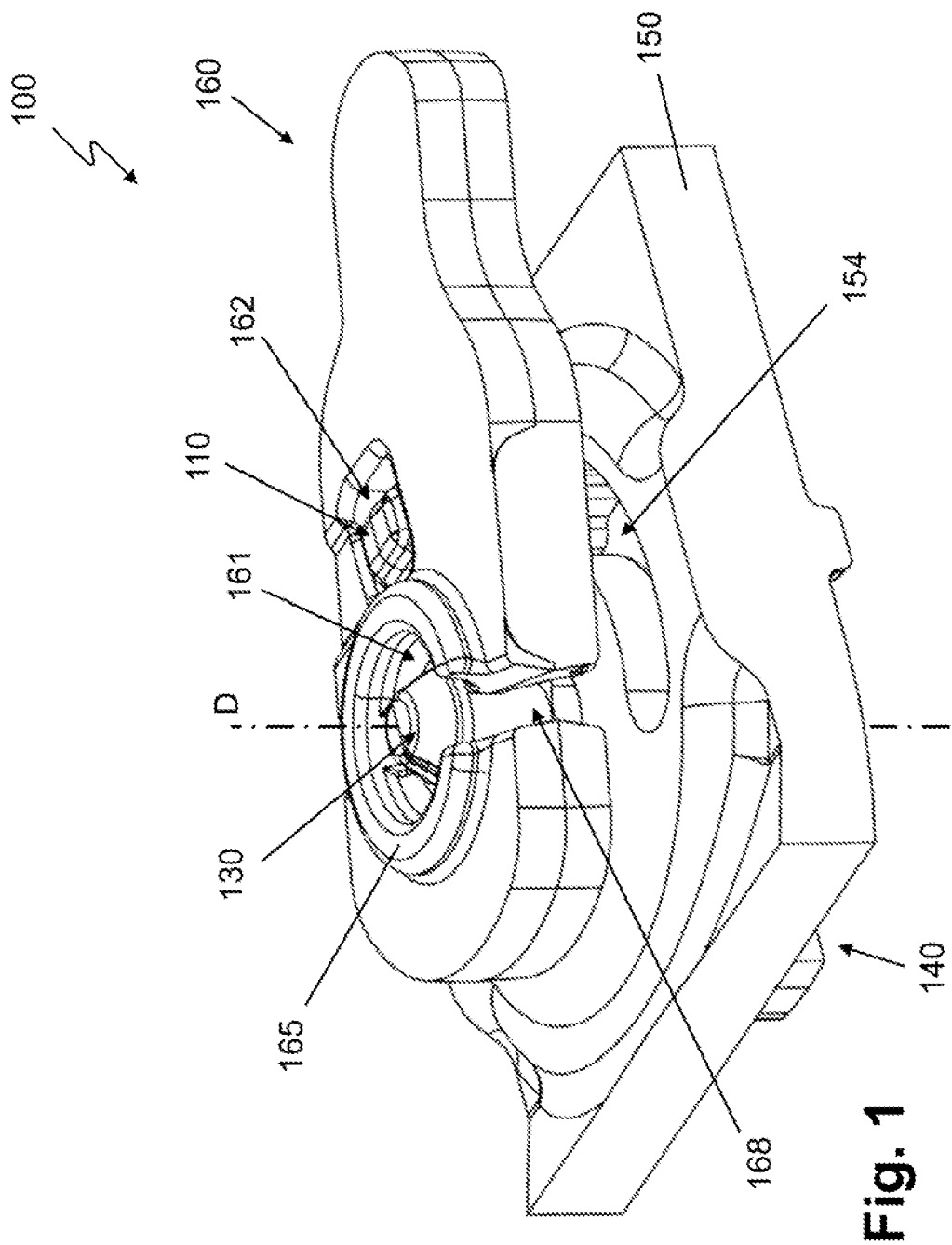
FIG. 1 shows a perspective illustration of a bearing arrangement in an exemplifying form of embodiment.

Elements provided in the drawings with the same reference numerals substantially correspond with one another insofar as nothing to the contrary is indicated. In addition, illustration and description of components not essential to understanding of the technical teaching disclosed herein have been dispensed with. Moreover, reference numerals are not repeated for all already introduced and illustrated elements insofar as the elements themselves and the function thereof have already been described or are known to an expert.

EXPLANATORY DESCRIPTION OF EMBODIMENTS

FIG. 1 shows a perspective illustration of a bearing arrangement 100 in an exemplifying form of embodiment. The bearing arrangement 100 serves for play-free and decoupled torque transmission for a slat 140 of an air vent (not illustrated in the figures). The air vent comprises a housing with opposite side walls, wherein slats 140 are mounted by way of a wall 150 and torque transmission decoupled from the play-free mounting is provided.

Figure 2:
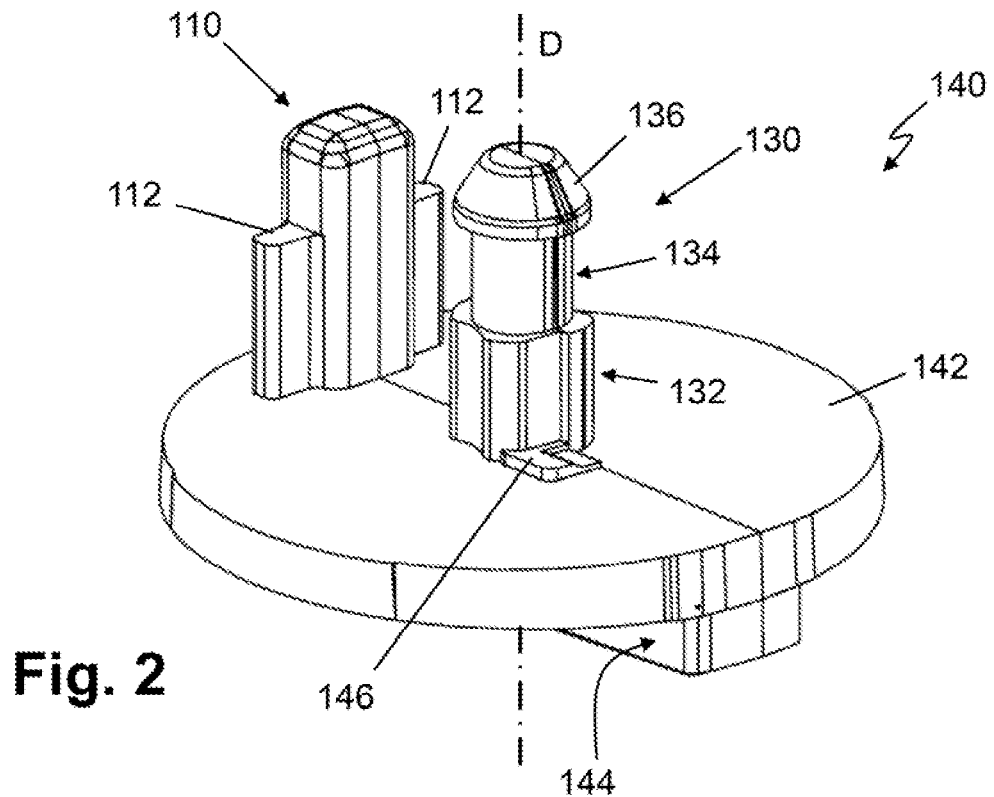
FIG. 2 shows a perspective illustration of the slat of the bearing arrangement of FIG. 1.

The air vent comprises a plurality of slats 140, wherein only one slat 140 and in each instance only one bearing arrangement 100 are shown in the figures. The other slats can be mounted at adjacent regions of the illustrated wall 150 by way of an identical bearing arrangement 100. The slat 140 is indicated only schematically in the figures. For that purpose an air guide surface 144 is merely indicated (see FIG. 2) and not shown over the entire length in an air channel of the air vent.

In addition to the slat 140, which serves as a first bearing component, the bearing arrangement 100 comprises a second bearing component in the form of a lever 160. The lever 160 can be connected by way of an entrainer pin, which is not illustrated in the figures, with an entrainer which is connected in corresponding manner with a plurality of slats 140 by way of entrainer pins at levers 160 and by way of which synchronous rotation of parallel rotatably mounted slats 140 can be achieved. For that purpose, the lever 160 has an entrainer pin (not illustrated) at its distal end remote from the axis D of rotation. The transmission of a rotational movement by way of the entrainer pin mounted eccentrically with respect to the axis D of rotation of the slat 140 enables application of a substantial pressure to the slat 140, for example in order to achieve sealing closure of parallel rotatably mounted slats 140. It is apparent that the moment on a slat 140 can be set by way of a lever 160 in dependence on the position of the entrainer pin or another corresponding element.

Figure 8:
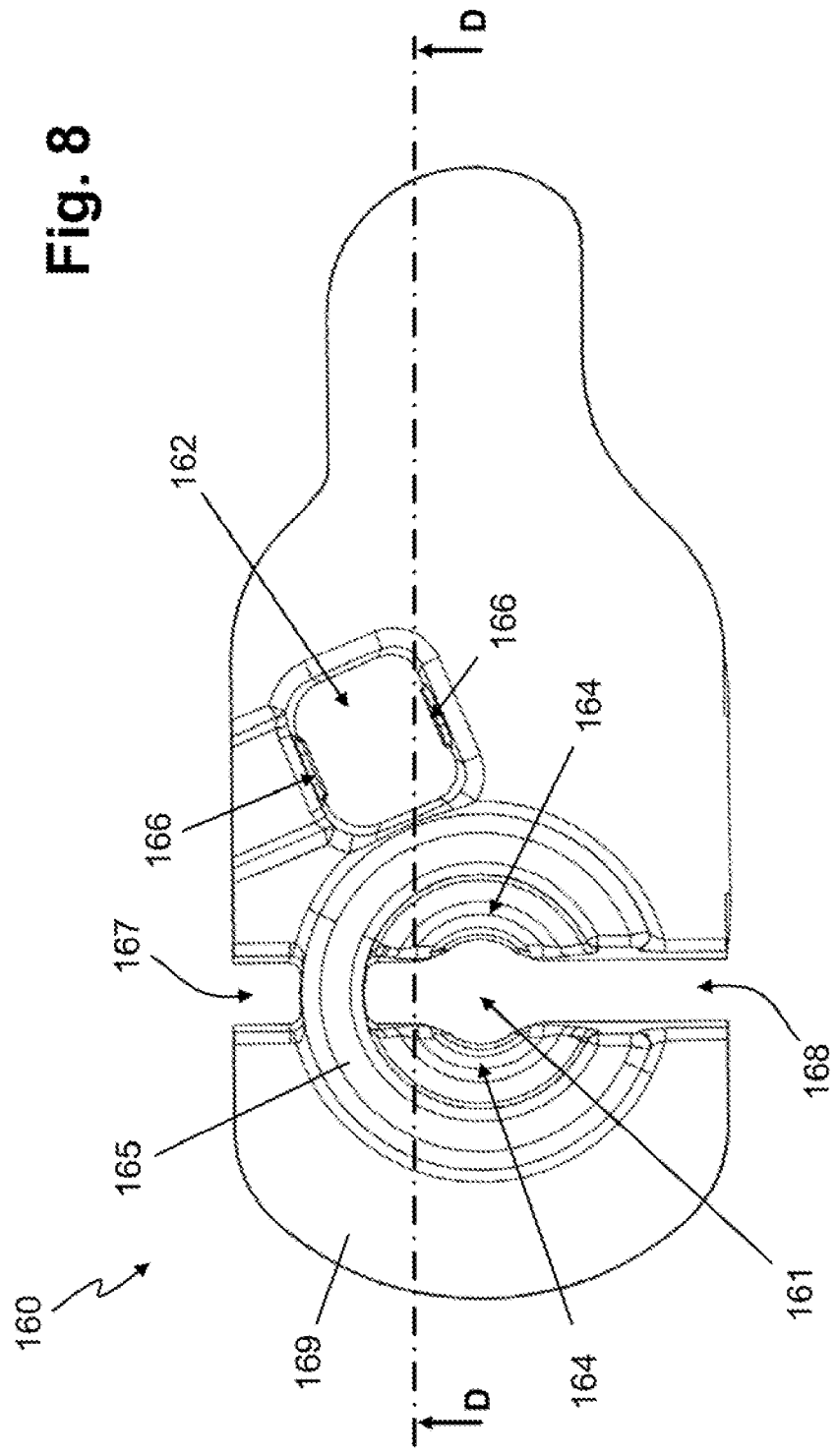
FIG. 8 shows a plan view of the lever of the bearing arrangement of FIG. 1.
Figure 9:
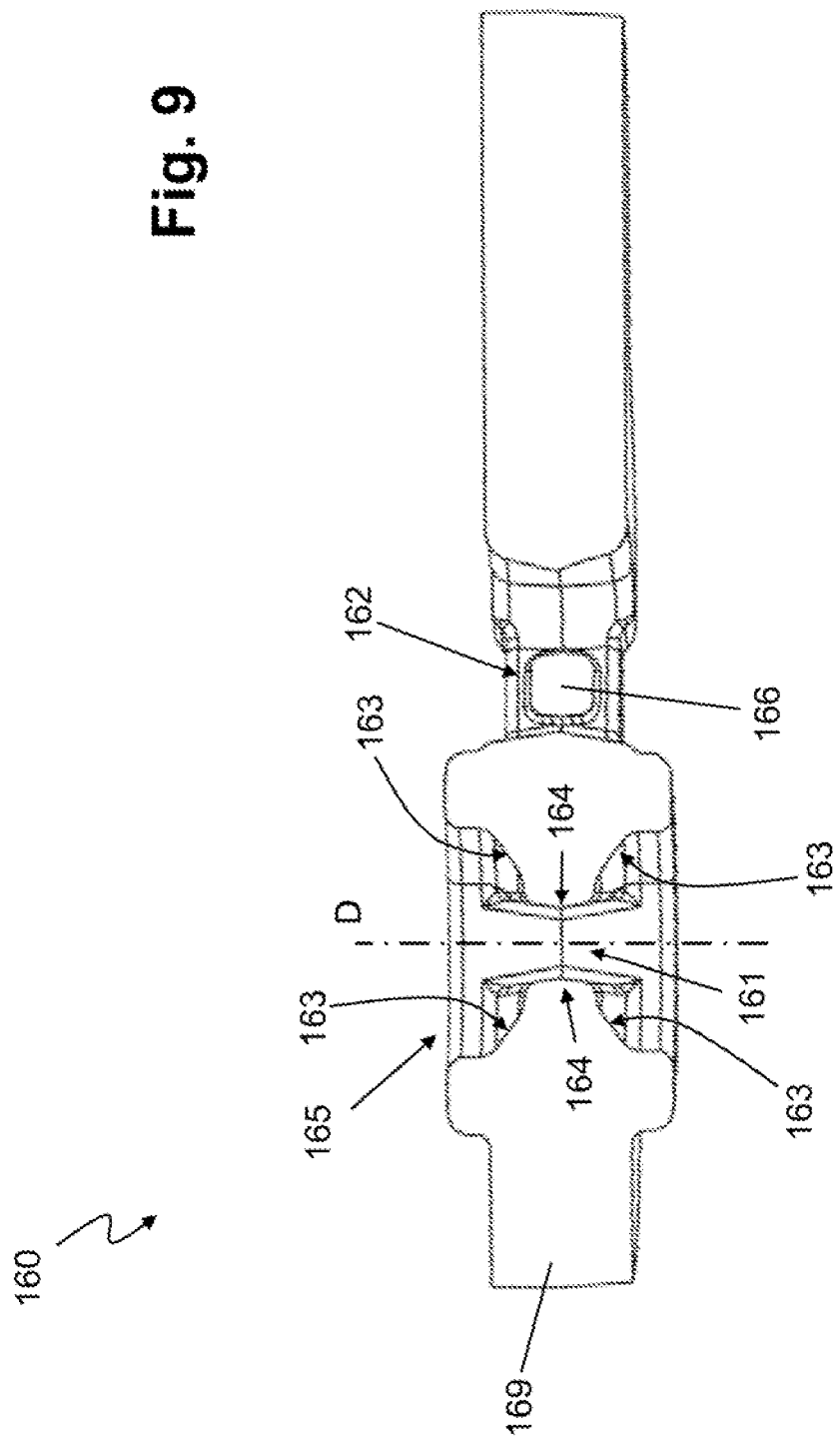
FIG. 9 shows a sectional view through the lever of FIG. 8 along the plane D-D.

The configuration of the lever 160 is shown in more detail in FIGS. 8 and 9.

The housing of the air vent, the slats 140 and the levers 160 consist of plastics material and are produced in an injection-moulding process. The configuration of the bearing arrangement 100 makes it possible to produce the components within wide tolerance ranges, as a result of which waste is minimized or reduced. In further forms of embodiment the components can also be produced by other methods.

Play-free mounting and decoupled torque transmission take place through the special design of the slat 140 with a bearing pin 130 and a coupling pin 110 as well as the lever 160. Moreover, the construction of the wall 150 also influences the mounting and torque transmission.

The lever 160 makes possible a simple configuration of the bearing pin 130 of the slat 140, since the rotation of the slat 140 is applied to the slat 140 not by way of the bearing pin 130, but by way of the coupling pin 110 mounted eccentrically with respect to the axis D of rotation. In order that transmission of, for example, a linear or transverse movement of an entrainer to the lever 160 for rotation of the slat 140 can take place, an appropriate construction of the lever 160 is required. In that case it is to be noted that the lever 160 is not connected with the slat 140 to be freely movable, so as to exclude play in the connection between lever 160 and slat 140 and thus also rattling. This can be achieved either by the fact that very tight tolerances are maintained or by the fact that use is made of a design as described in the following. Close prescriptions of tolerances have the disadvantage that production is connected with a high level of outlay and thus with high costs. In addition, this has the consequence of substantial wastage.

The bearing arrangement 100 described herein offers the possibility of transmission of torque to the slat 140 without the bearing pin 130 having to have a comparatively large diameter and without close tolerances having to be produced.

The slat 140 of the bearing arrangement 100 is shown in perspective illustration in FIG. 1 and has an air guide surface 144. The air guide surface 144 is merely indicated in FIG. 2. Starting from a bearing plate 142 in FIG. 2 the air guide surface 144 extends downwardly and forms the surface in the air vent by way of which deflection of air in the air channel of the air vent can take place. The bearing plate 142 is received in a mount 156 (see, for example, FIG. 5) of the wall 150.

The bearing plate 142 can be rotatably mounted with play in the mount 156 so that there is no blocking during rotation of the slat 140 and larger tolerance ranges can be selected for the bearing plate 142. The bearing plate 142 and/or the circumferential wall of the mount 156 can have damping or sealing elements at the circumference, for example applied by a special coating (for example of thermoplastic elastomer (TPE) or silicone). Sealing of the air channel relative to the environment is provided by way of the damping and/or sealing elements, so that no air escapes from the air channel of the air vent apart from an air outlet opening.

The construction of damping and/or sealing elements can be realised by a two-component injection moulding. In that case, the bearing plate 142 as well as further components of the slat 140 are made from a first plastics material and the damping and/or sealing elements as well as a first support element 158 (see FIGS. 3 and 5) are made from a second plastics material. The second plastics material can comprise, for example, the afore-mentioned materials.

The mounting of the slat 140 by way of the bearing plate 142 at the inner side of the wall 150 in the mount 156 prevents occurrence of turbulence and consequently of disruptive noises in the air channel of the air vent, since the air always flows along the inner side of the wall 150 at a substantially planar surface. No disturbing elements project into the air channel. The mount 156 is substantially closed by the bearing plate 142. For that purpose the bearing plate 142 has a height substantially corresponding with the height of the mount 156 so that the lower side, which faces the air channel, of the bearing plate 142 is flush with the inner side of the wall 150 in substantially planar manner.

The coupling pin 110 and the bearing pin 130 extend from the bearing plate 142 on the opposite side with respect to the air guide surface 144. The bearing pin 130 extends centrally from the bearing plate 142 and runs through the axis D of rotation. The slat 140 is mounted in the bearing opening 152 of the wall 150 by way of the bearing pin 130 in the housing of the air vent to be rotatable about the axis D of rotation.

The bearing pin 130 has a bearing section 132. The bearing section 132 is received in the bearing opening 152. The circumferential wall of the bearing section 132 is opposite the circumferential wall of the bearing opening 152 or bears against this. Starting from the bearing plate 142 a detent section 134 and subsequently a mushroom head 136 extend beyond the bearing section 132. The bearing section 134 has a smaller diameter by comparison with the bearing section 132 and the mushroom head 136. Detenting can thus be achieved by introduction of the detent section 134 into a first opening 161 of the lever 160 with a corresponding diameter or cross-section (see, for example, FIG. 5). The mushroom head 136 has, starting from the bearing plate 142, at its upper end a downwardly increasing diameter. The mushroom head 136 has at the lower side a substantially planar ring which extends in a plane orthogonal to the axis D of rotation. After insertion of the bearing pin 130 into the first opening 161 the lower side of the mushroom head 136 lies on an edge of the first opening 161 and prevents movement of the bearing pin 130 out of the first opening 161. In the detented state, first support sections 164 of the lever 160 bear against the circumferential wall of the detent section 134 and are received between the lower side of the mushroom head 136 and the bearing section 132.

The coupling pin 110 is arranged at the bearing plate 142 eccentrically with respect to the axis D of rotation. The coupling pin 110 has two laterally projecting elements which form a shoulder 112 at its upper side. The shoulders 112 serve for supporting the lever 160 in the direction of the axis D of rotation.

A second support element 146 is present on the bearing plate 142 and projects, as an elevation, from the surface of the bearing plate 142. The second support element 146 is disposed in the immediate vicinity of the bearing pin 130 and is opposite the coupling pin 110 with respect to the axis D of rotation. The second support element 146 serves for supporting the slat 140 at the inner side of the wall 150 in the mount 156. The second support element 146 thus reduces the support area or contact area of the slat 140 in the mount 156. Friction due to the mounting of the slat 140 can thus be reduced. Moreover, compensation for play for the bearing arrangement 100 can additionally be provided by way of the second support element 146, in which case a lever 160 can additionally be supported at the outer side of the wall 150, as described in more detail in the following.

Figure 3:
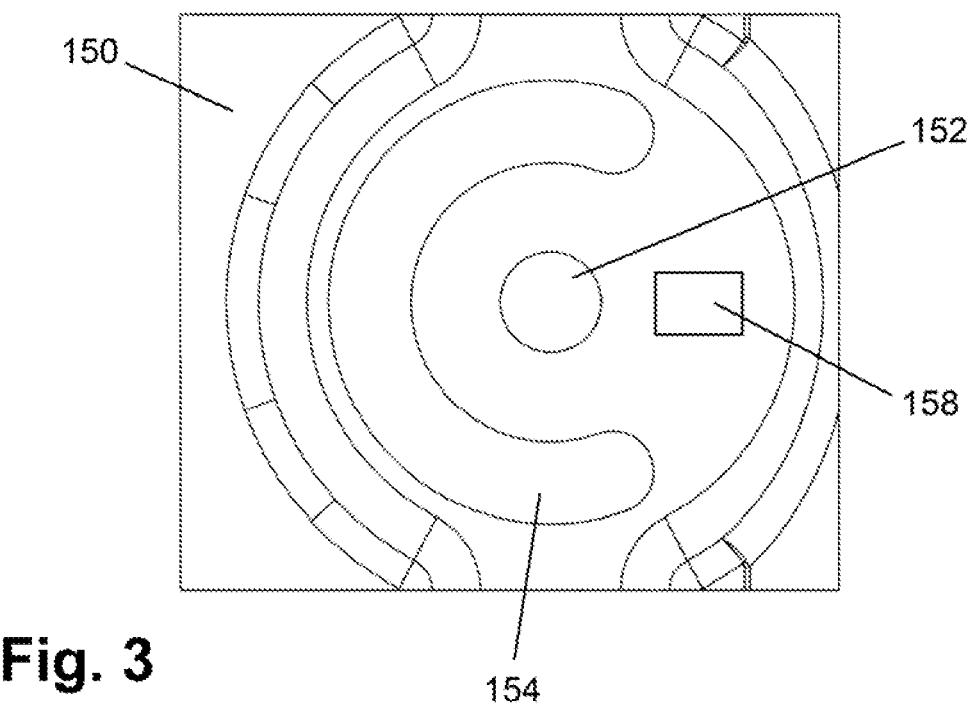
FIG. 3 shows a schematic illustration of part of the wall of the bearing arrangement of FIG. 1.

FIG. 3 shows a schematic illustration of a part of the wall 150 of the bearing arrangement 100 with a view onto the wall 150 from outside the air channel. The wall 150 has the bearing opening 152, which is provided for mounting the bearing section 132 of the bearing pin 130. The diameter of the bearing opening 152 is selected so that the bearing pin 130 or the bearing section 132 is received with play in the bearing opening 152. The axis D of rotation extends centrally through the bearing opening 152. A guide slot 154 extends around the bearing opening 152. The coupling pin 110 is received in the guide slot 154 in the inserted state of the slat 140. The coupling pin 110 can be displaced within the guide slot 154 until it bears against ends of the guide slot 154. The configuration of the guide slot 154 thus also establishes the maximum amount by which the slat 140 can be rotated. The coupling pin 110 is received with play in the guide slot 154. The first support element extends from the surface of the wall 150 eccentrically with respect to the bearing opening 152. The first support element 158 consists of a plastics material which is softer by comparison with the plastics material of the wall 150. For example, the first support element 158 consists of TPE. The first support element 158 protrudes from the surface of the wall 150 and projects in the direction of the lever 160 (see FIG. 5). By virtue of its softer construction, the first support element 158 can be compressed in a definable range. The first support element 158 is thus constructed to be resilient and assists play-free mounting of the slat 140 on the wall 150 by way of the lever 160.

Figure 4:
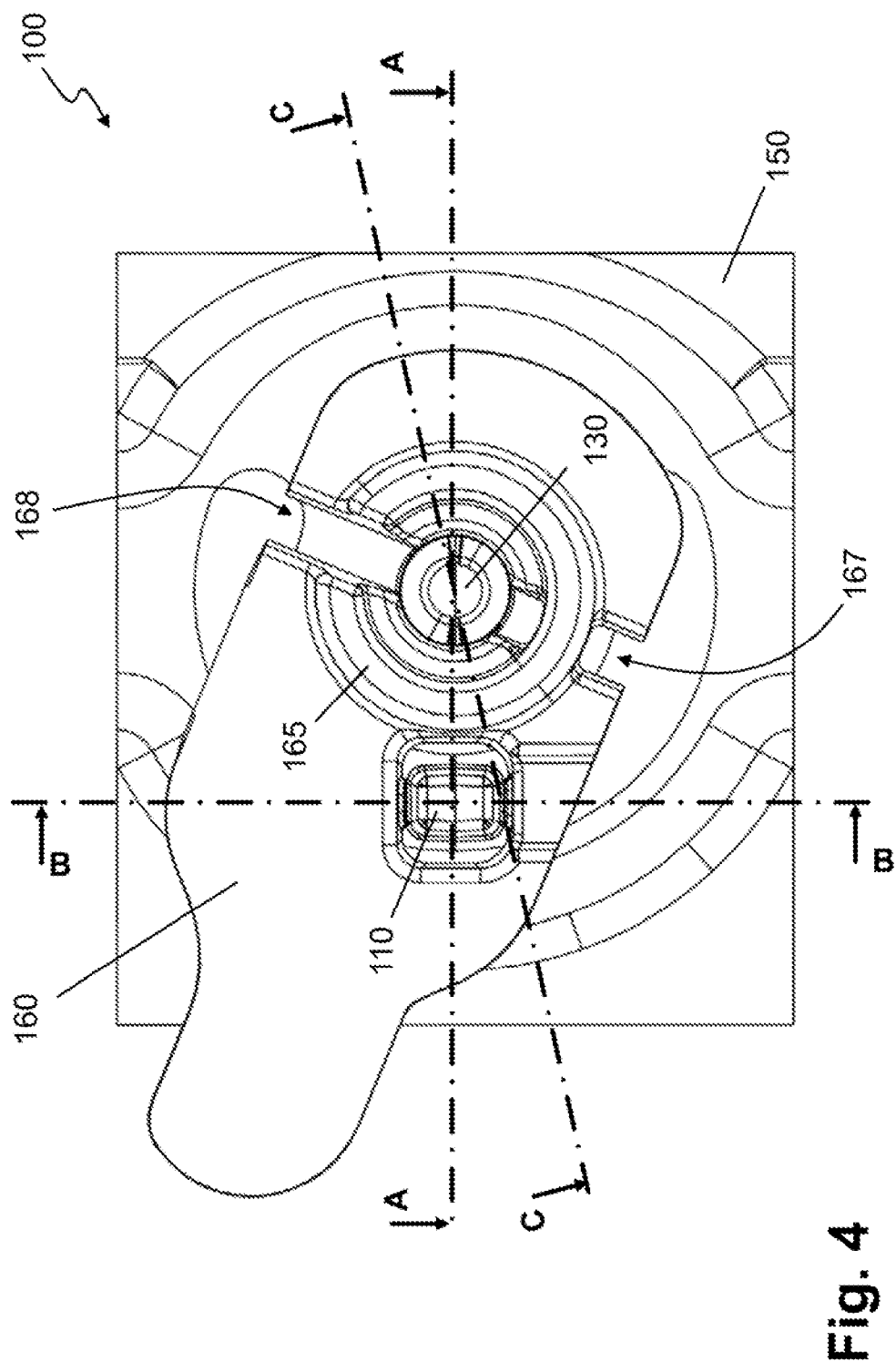
FIG. 4 shows a plan view of the bearing arrangement of FIG. 1.

FIG. 4 shows a plan view of the bearing arrangement 100 of FIG. 1. The eccentric mounting of the coupling pin 110 with respect to the axis D of rotation and the bearing pin 130 as well as the eccentric position of a possible coupling point for an entrainer pin are shown in this illustration.

FIG. 4 shows incisions 167 and 168 which divide the lever 160 in the region of the first opening 161. As illustrated in more detail in FIG. 8, the lever 160 is divided by way of the incisions 167, 168 in the region of the first opening 161 and the opposite first support sections 164 are connected together only by way of the ring 165. The ring 165 is not formed to be closed, so that the width of the first opening 161 can be changed by spreading apart (for example during introduction of the mushroom head 136). The two opposite first support sections 164 can therefore be displaced relative to one another not only in radial direction, but also in axial direction with respect to the first opening 161.

Figure 5:
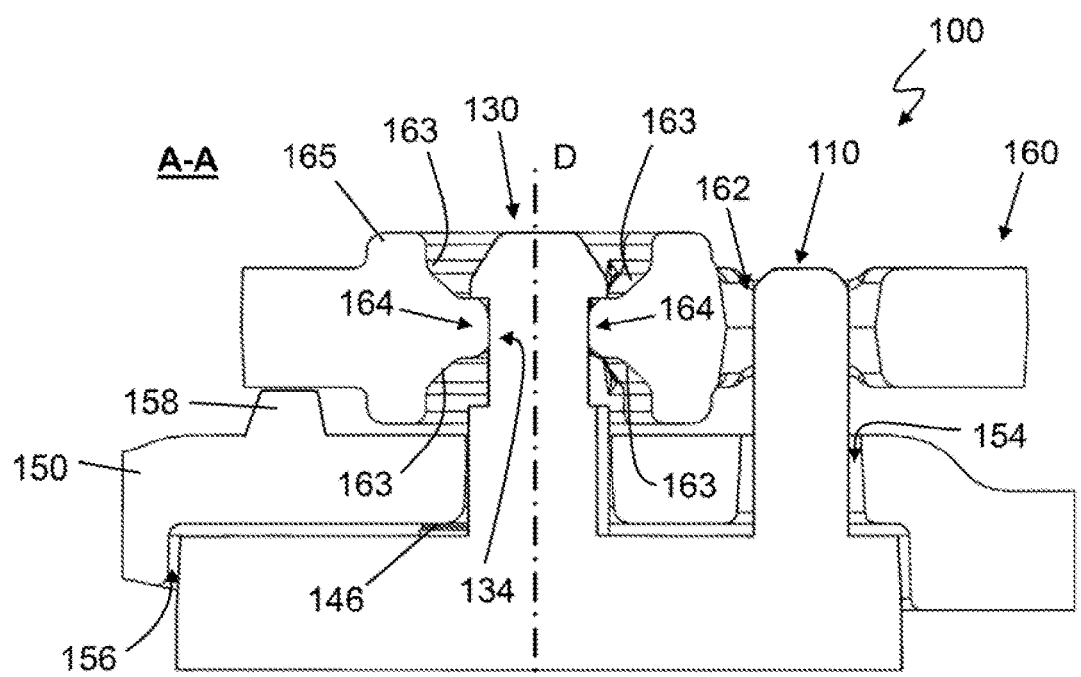
FIG. 5 shows a sectional view through the bearing arrangement of FIG. 4 along the plane A-A.

FIG. 5 shows a sectional view through the bearing arrangement 100 of FIG. 4 along the plane A-A. The detented state is shown, in which the coupling pin 130 is so received in the first opening 161 that the opposite first support sections 164 bear against the bearing section 132 and displacement of the coupling pin 130 out of the first opening 161 by way of the mushroom head 136 is prevented. In the region of the first opening 161 the opposite support sections 164 have chamfers 163 which facilitate insertion of the mushroom head 136.

Figure 6:
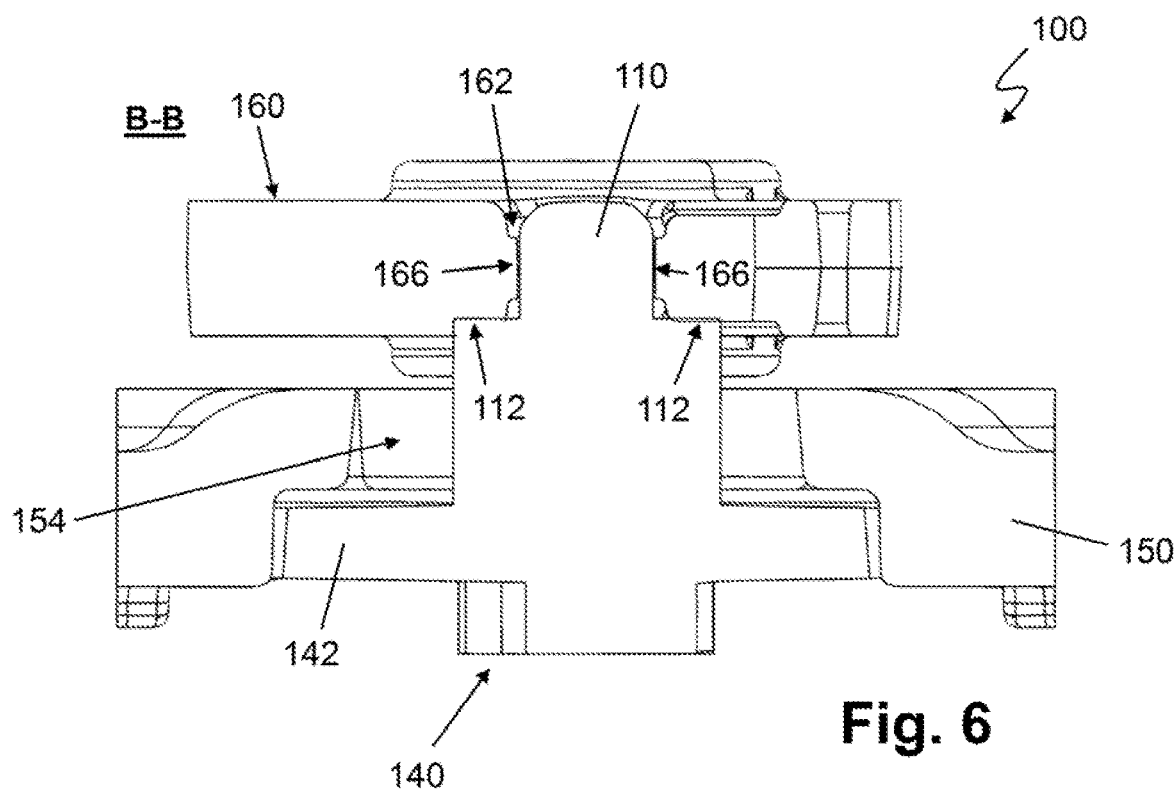
FIG. 6 shows a sectional view through the bearing arrangement of FIG. 4 along the plane B-B.

The slat 140 bears against the inner side of the mount 156 of the wall 150 by the bearing plate 142 via the second support element 146. The lever 160 is connected with the slat 140 in play-free manner outside the air channel by way of the coupling pin 110 and the bearing pin 130 with the detent means in the form of the mushroom head 136. For that purpose, the opposite first support sections 164 are supported on the lower side of the mushroom head 136. Apart from the mounting by way of the bearing pin 130, the lever 160 is supported on the shoulders 112 as shown in the sectional view through the plane B-B in FIG. 6. On the other side, the lever 160 is supported on the first support element 158. The first support element 158 can in that case be exchanged. It is thus ensured that the connection between lever 160 and slat 140 is free of play.

For the play-free mounting on the wall 150 the lever 160 is in contact with the wall 150 at the outer side of the wall 150 by way of the first support element 158. That can be achieved in further embodiments (not illustrated) by way of, for example, a region of the ring 165 instead of the first support element 158. The support of the lever 160 preferably takes place in a region opposite the support element 146 with respect to the axis D of rotation so that tipping is prevented and play-free mounting is ensured.

Figure 7:
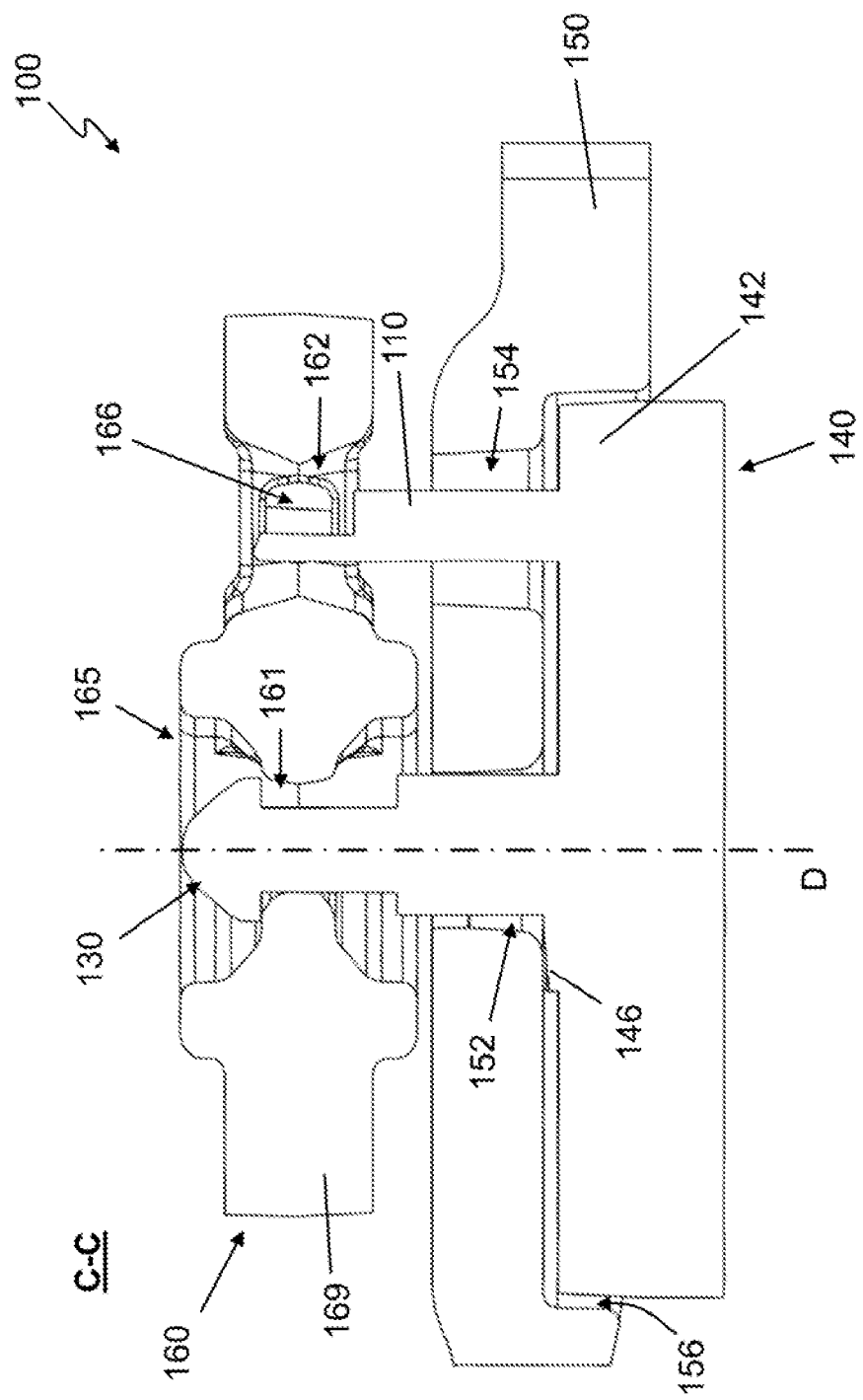
FIG. 7 shows a sectional view through the bearing arrangement of FIG. 4 along the plane C-C.

FIG. 7 shows a sectional view through the bearing arrangement 100 of FIG. 4 along the plane C-C and clarifies the bracing of the lever 160 by way of the support at the shoulders 112 and at the lower side of the mushroom head 136 in opposite directions. For that purpose, supporting at the first support element 158, which in the sectional view of FIG. 7 lies outside the sectional plane and therefore is not shown, is also required. The height or position of the sections required for the bracing—namely shoulders 112, lower side of mushroom head 136, first support element 158—influence how much the lever 160 is braced. Moreover, the bracing of the lever 160 can be influenced by way of the spacing of the coupling pin 110 from the bearing pin 130. Regions, which surround the second opening, of the lever 160 rest on the shoulders 112. The support of the lever 160 on the shoulders 112 is carried out in the illustrated form of embodiment not by way of the section support sections 166 themselves.

Two opposite second support sections 166 are provided in the second opening 162. The second support sections 166 receive the upper end of the coupling pin 110 therebetween. The second support sections 166 have a transition fit with respect to the coupling pin 110. The coupling pin 110 thus does not have any play in the second opening 162.

FIG. 8 shows a plan view of the lever 160 of the bearing arrangement 100 of FIG. 1. By way of the incisions 167, 168 the lever 160 is divided in the region of the first opening 161 with the opposite support sections 164 and connected merely by way of the ring 165. The section, which is disposed remotely from the second opening 162, of the lever 160 forms a resilient section 169 of the lever 160. The resilient section 169 is formed relative to the opposite section of the lever 160 not only in axial direction, but also in radial direction with respect to the first opening 161. For that purpose the ring 165 is formed to be sufficiently flexible in the connecting region between the sections.

The two first support sections 164 are formed to be curved and surround the first opening 161 at a mutual spacing. The two first support sections 164 are a component of the C-shaped ring 165, which surrounds the first opening 161 and provides the resilient construction of the lever 160.

FIG. 9 shows a sectional view through the lever 160 of FIG. 8 along the plane D-D. It is shown in the sectional view that the second support sections 166 are present only within the second opening 162 and thus cannot serve as a support for the shoulders 112. In further forms of embodiment (not illustrated) a coupling pin 110 can also be so received in a second opening 162 in such a way that support sections 166 at the same time serve as a rest for the shoulders 112.

The bearing device 100 herein enables transmission of torque to a bearing pin 130 and a slat 140 without close tolerances having to be maintained and/or without the bearing pin 130 having to be provided with large diameters, plates, etc. The connection between a slat 140 and a lever 160 is provided free of play by way of the bearing arrangement 100. Moreover, compensation for play can also be provided in the mounting with respect to the wall 150, in which case the braced arrangement between slat 140 and lever 160 is additionally supported at both sides of the wall 150.

REFERENCE NUMERAL LIST

100 bearing arrangement
110 coupling pin
112 shoulder
130 bearing pin
132 bearing section
134 detent section
136 mushroom head
140 slat
142 bearing plate
144 air guide surface
146 support element
150 wall
152 bearing opening
154 guide slot
156 mount
158 support element
160 lever
161 first opening
162 second opening
163 chamfer
164 support section
165 ring
166 support section
167 incision
168 incision
169 resilient section
D axis of rotation

The invention claimed is:

1. A bearing arrangement with a first bearing component, comprising a bearing pin and a coupling pin, and a second bearing component, the bearing components being mounted on a wall to be rotatable about a common axis of rotation, wherein
the bearing pin extends along the axis of rotation and the coupling pin extends eccentrically with respect to the axis of rotation,
the bearing pin is received in a bearing opening of the wall,
the coupling pin is received in a guide slot of the wall and projects out of the guide slot,
the second bearing component has a first opening, in which the bearing pin is received, and a second opening, which is arranged eccentrically with respect to the first opening and in which the coupling pin is received,
the bearing pin is connected with the second bearing component by way of a detent and
the second bearing component is supported on the coupling pin.

2. The bearing arrangement according to claim 1, wherein the second bearing component is resiliently supported on the coupling pin.

3. The bearing arrangement according to claim 1, wherein the first bearing component and the second bearing component are supported on the wall at opposite sides.

4. The bearing arrangement according to claim 1, wherein the coupling pin has at least one shoulder on which the second bearing component is supported.

5. The bearing arrangement according to claim 1, wherein the bearing pin comprises a detent element which by comparison with a bearing section adjoining along the axis of rotation has a larger diameter which is greater than the diameter of the first opening of the second bearing component, and wherein the detent element engages behind the first opening of the second bearing component.

6. The bearing arrangement according to claim 1, wherein the second bearing component is constructed to be radially resilient in the region of the first opening and/or the bearing pin is constructed to be radially resilient.

7. The bearing arrangement according to claim 5, wherein the first bearing component and/or the first opening of the second bearing component has or have chamfers configured to facilitate insertion of the detent element.

8. The bearing arrangement according to claim 1, wherein the first bearing component has a support element directed towards the wall.

9. The bearing arrangement according to claim 5, wherein the second bearing component has at least two support sections, which are displaceable relative to one another in the axial direction of the first opening, for the detent element.

10. An air vent with a housing and at least one bearing arrangement according claim 1, wherein the first bearing component is constructed as an air guide element and the bearing pin and the coupling pin are received in a bearing opening and a guide slot of a wall of the air vent, and wherein the second bearing component is constructed as a lever and the air guide element is mounted free of play on the wall by way of the bearing pin, the coupling pin, a support element, a support element at the wall and a detent element.

11. The air vent according to claim 10, wherein the bearing pin of the bearing arrangement comprises a detent element which by comparison with a bearing section adjoining along the axis of rotation has a larger diameter which is greater than the diameter of the first opening of the second bearing component, and wherein the detent element engages behind the first opening of the second bearing component.

12. The air vent according to claim 11, wherein the first bearing component and/or the first opening of the second bearing component has or have chamfers configured to facilitate insertion of the detent element.

13. The air vent according to claim 11, wherein the second bearing component has at least two support sections, which are displaceable relative to one another in the axial direction of the first opening, for the detent element.

14. The air vent according to claim 10, wherein the first bearing component has a second support element directed towards the wall.

* * * * *